(12) United States Patent
Jiang et al.

(10) Patent No.: US 11,507,191 B2
(45) Date of Patent: Nov. 22, 2022

(54) REMOTE CONTROL OF APPLICATIONS

(71) Applicant: Microsoft Technology Licensing, LLC, Redmond, WA (US)

(72) Inventors: Yan Jiang, Redmond, WA (US); Li Li, Redmond, WA (US); Chao Li, Redmond, WA (US); Yang Shu, Redmond, WA (US); Qi Ren, Redmond, WA (US); Erlei Xu, Redmond, WA (US); Niangjun Zhu, Redmond, WA (US); Hongjun Qiang, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 24 days.

(21) Appl. No.: 16/477,044

(22) PCT Filed: Feb. 17, 2017

(86) PCT No.: PCT/CN2017/074017
§ 371 (c)(1),
(2) Date: Jul. 10, 2019

(87) PCT Pub. No.: WO2018/148949
PCT Pub. Date: Aug. 23, 2018

(65) Prior Publication Data
US 2019/0332180 A1   Oct. 31, 2019

(51) Int. Cl.
*G06F 3/01* (2006.01)
*G06F 3/03* (2006.01)
(Continued)

(52) U.S. Cl.
CPC .............. *G06F 3/017* (2013.01); *G06F 3/013* (2013.01); *G06F 3/015* (2013.01); *G06F 3/0304* (2013.01);
(Continued)

(58) Field of Classification Search
CPC ..... G06F 17/30581; G06F 3/12; H04L 12/24; H04L 29/08; H04L 63/0421
See application file for complete search history.

(56) References Cited

U.S. PATENT DOCUMENTS 10,768,873 B1 * 9/2020 Alacar .................. G06F 3/1204
2002/0105624 A1   8/2002 Quori
(Continued)

FOREIGN PATENT DOCUMENTS

CN      102510426 A    6/2012
CN      202383623 U    8/2012
(Continued)

OTHER PUBLICATIONS

"First Office Action and Search Report Issued in Chinese Patent Application No. 201780031161.9", dated Dec. 23, 2020, 12 Pages.
(Continued)

*Primary Examiner* — William Lu
(74) *Attorney, Agent, or Firm* — Schwegman Lundberg & Woessner, P.A.

(57) ABSTRACT

Techniques for remote control of applications are described. A method according to an aspect of the disclosure comprises receiving, from an input processing unit, one ore more commands for performing one or more operations of an application instance; identifying, through checking pairing information, the application instance paired with the input processing unit; and sending to the identified application instance, the received one or more commands.

18 Claims, 7 Drawing Sheets

(51) Int. Cl.
  *H04L 67/125* (2022.01)
  *H04W 12/069* (2021.01)
  *H04W 12/06* (2021.01)

(52) U.S. Cl.
  CPC ......... *H04L 67/125* (2013.01); *H04W 12/069* (2021.01); *H04W 12/06* (2013.01)

(56) References Cited

U.S. PATENT DOCUMENTS

| | | |
|---|---|---|
| 2005/0165599 A1 | 7/2005 | Russell et al. |
| 2007/0155367 A1 | 7/2007 | Chao et al. |
| 2008/0165024 A1* | 7/2008 | Gretton ............... G01C 21/3655 340/4.31 |
| 2009/0204410 A1 | 8/2009 | Mozer et al. |
| 2011/0029692 A1* | 2/2011 | Chassot ................ G06F 3/0227 710/14 |
| 2011/0276875 A1* | 11/2011 | McCabe ............... G06F 40/197 715/255 |
| 2012/0054640 A1* | 3/2012 | Nancke-Krogh ......... G06F 9/54 715/751 |
| 2012/0117141 A1* | 5/2012 | Beaver .................. H04L 69/329 709/203 |
| 2012/0238216 A1* | 9/2012 | Hallowell ............. H04W 84/18 455/41.3 |
| 2013/0031261 A1 | 1/2013 | Suggs |
| 2013/0036117 A1* | 2/2013 | Fisher .................. G06F 16/487 707/736 |
| 2013/0328667 A1 | 12/2013 | Kumar et al. |
| 2014/0173686 A1* | 6/2014 | Kgil ...................... H04L 63/205 726/1 |
| 2014/0279896 A1* | 9/2014 | Branton ................ G06F 16/275 707/634 |
| 2015/0019229 A1 | 1/2015 | Fish |
| 2015/0042447 A1* | 2/2015 | Vogt ....................... G08C 23/04 340/4.41 |
| 2015/0128061 A1 | 5/2015 | Lesner |
| 2015/0341213 A1* | 11/2015 | Feng ....................... H04L 67/16 709/221 |
| 2016/0004565 A1* | 1/2016 | Harper ................ G06F 3/04842 718/102 |
| 2016/0034249 A1 | 2/2016 | Lee et al. |
| 2016/0077793 A1 | 3/2016 | Disano et al. |
| 2016/0080896 A1* | 3/2016 | Song ..................... H04L 65/607 455/41.2 |
| 2016/0179449 A1* | 6/2016 | Cho ....................... G06F 3/1275 358/1.15 |
| 2016/0182803 A1* | 6/2016 | Song .................. H04N 5/23206 348/211.2 |
| 2016/0184635 A1* | 6/2016 | Kwon ..................... H04W 4/20 455/41.2 |
| 2017/0054770 A1* | 2/2017 | Wells ...................... H04L 65/65 |
| 2018/0199202 A1* | 7/2018 | Hui ....................... H04L 63/083 |
| 2018/0254898 A1* | 9/2018 | Sprague ................. H04L 9/006 |
| 2021/0136129 A1* | 5/2021 | Ponnusamy ........... H04L 67/53 |

FOREIGN PATENT DOCUMENTS

| | | |
|---|---|---|
| CN | 102968269 A | 3/2013 |
| CN | 103187079 A | 7/2013 |
| CN | 104219388 A | 12/2014 |
| CN | 105074620 A | 11/2015 |
| KR | 20140035773 A | 3/2014 |

OTHER PUBLICATIONS

"International Search Report and Written Opinion Issued in PCT Application No. PCT/CN2017/074017", dated Nov. 20, 2017, 12 Pages.

Dennis, "How to use your Mobile Device as Remote Control for YouTube on PC", Retrieved from: https://diaryofdennis.com/2015/01/06/how-to-use-your-mobile-device-as-remote-control-for-youtube-on-pc/, Jan. 6, 2015, 6 Pages.

"Second Office Action Issued in Chinese Patent Application No. 201780031161.9", (w/ English Translation), dated Jun. 28, 2021, 19 Pages.

"Office Action Issued in Indian Patent Application No. 201917032636", dated Jan. 18, 2022, 6 Pages.

* cited by examiner

REMOTE CONTROL OF APPLICATIONS

CROSS-REFERENCE TO RELATED APPLICATIONS

This application is a U.S. National Stage Filing under 35 U.S.C. 371 of International Patent Application Serial No. PCT/CN2017/074017, filed Feb. 17, 2017, and published as WO 2018/148949 A1 on Aug. 23, 2018, which application and publication are incorporated herein by reference in their entirety.

BACKGROUND

The emergence of various types of application software, especially a variety of productivity tools running on computing systems such as personal computers, servers, smartphones, and/or cloud-computing platforms has led to increased convenience and efficiency for modern life, work and study. Conventional controlling manners available for these applications or tools, such as the use of keyboards, mouses, and/or even touch panels, are not quite natural and efficient under some conditions, which would adversely impede the usage of the application or tools.

SUMMARY

This summary is provided to introduce a selection of concepts in a simplified form that are further described below in the detailed description. This summary is not intended to identify any key features or essential features of the claimed subject matter, nor is it intended to be used as an aid in determining the scope of the claimed subject matter.

According to an embodiment of the disclosure, a method is provided. The method comprises: receiving, from an input processing unit, one or more commands for performing one or more operations of an application instance; identifying, through checking pairing information, the application instance paired with the input processing unit; and sending, to the identified application instance, the received one or more commands.

According to another embodiment of the disclosure, a method is provided. The method comprises: receiving command information; generating, based on the command information, one or more commands for performing one or more operations of an application instance; and executing the generated one or more commands.

According to a further embodiment of the disclosure, an apparatus is provided. The apparatus comprises: a receiving module configured to receive command information; a generating module configured to generate, based on the command information, one or more commands for performing one or more operations of an application instance; and an executing module configured to execute the generated one or more commands.

BRIEF DESCRIPTION OF THE DRAWINGS

Embodiments of the present disclosure are illustrated by way of example, and not by way of limitation, in the figures of the accompanying drawings in which like references numerals refers to identical or similar elements and in which.

DETAILED DESCRIPTION

Figure 1:
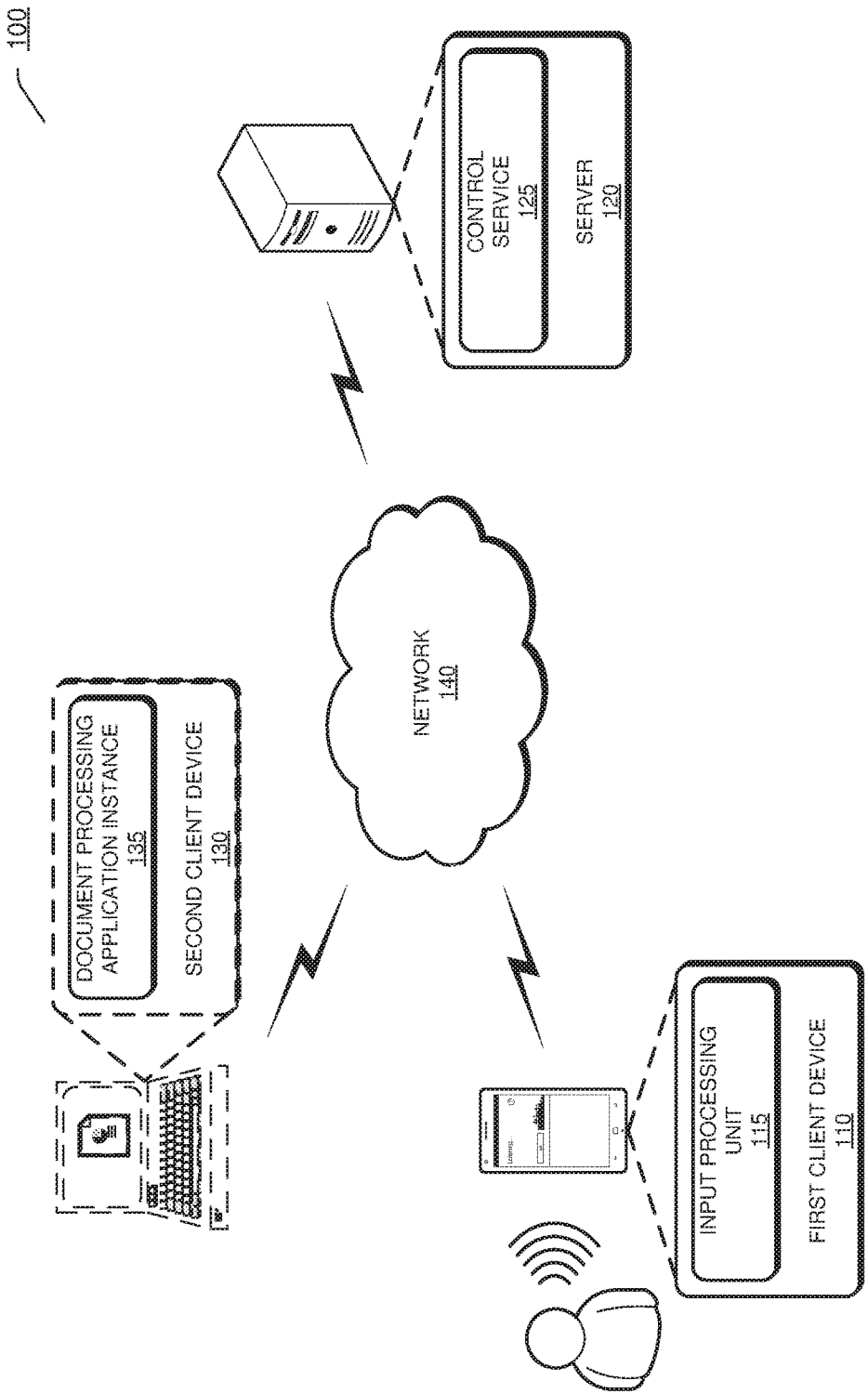
FIG. 1 illustrates an exemplary operating environment where some embodiments of the disclosure may be practiced.

In the following description, numerous specific details are set forth for the purposes of explanation. It should be understood that, however, embodiments of the present disclosure may be practiced without these specific details. In other instances, well-known circuits, structures and techniques have not been shown in detail in order not to obscure the understanding of the disclosure.

References to "one embodiment", "an embodiment", "exemplary embodiment", "some embodiments", "various embodiments" or the like throughout the description indicate that the embodiment(s) of the present disclosure so described may include particular features, structures or characteristics, but it is not necessarily for every embodiment to include the particular features, structures or characteristics. Further, some embodiments may have some, all or none of the features described for other embodiments.

In the following description and claims, the terms "coupled" and "connected", along with their derivatives, may be used. It should be understood that these terms are not intended as synonyms for each other. Rather, in particular embodiments, "connected" is used to indicate that two or more elements are in direct physical or electrical contact with each other, while "coupled" is used to indicate that two or more elements co-operate or interact with each other, but they may or may not be in direct physical or electrical contact.

A large number of applications including productivity tools such as document processing applications are widely used in various scenarios. For example, one may use a presentation program to edit and present slides, use an electronic spreadsheet program to organize, analyze and store data in tabular form, and use a word processor to compose or edit a word-processing document, and so on. Examples of the document processing applications that are available on the market include, without limitation, those from Microsoft Office suite, Google Docs suite, Apple iWork suite, Kingsoft WPS Office suite, Apache OpenOffice suite, and etc.

One or more embodiments of the disclosure are to provide a more natural and efficient way to control an instance of an application or to perform one or more operations thereof. According to some embodiments of the disclosure, a user is enabled to control an application instance or to perform one or more operations thereof through voice input. In some embodiments, the application instance may comprise a document processing application instance, and accordingly, the control may relate to various operations/functions including but not limited to presenting, editing, saving, and printing of an electronic document operated in the document processing application instance. As an example, the electronic document may be one of a word-processing document, a slide show presentation document, an electronic spreadsheet document, and etc., although the present disclosure is not limited in this aspect.

Voice control of operations of document processing application instances is particularly useful for some scenarios where those conventional ways such as keyboards, mouses, and/or touch panels may not be easy to use. For example, when a user is doing a presentation, conventionally, the presenter has to step back and force around the computer running the document processing application instance and is busy with hitting a keyboard for presentation navigation, slide editing, and the like, which may be troublesome especially if the presenter is in a large room or hall and is remote from the computer. As another example, it may be inconvenient or even difficult for some disabled people to edit electronic documents operated in document processing application instances with the conventional manners.

FIG. 1 illustrates an exemplary operating environment 100 where some embodiments of the disclosure may be practiced. The operating environment 100 may include a first client device 110 having an input processing unit 115, a server 120 having a control service 125, and a second client device 130 having a document processing application instance 135, which may be communicatively coupled to each other over a network 140.

In an exemplary scenario, a user may intend to perform one or more operations of the document processing application instance 135 on the second client device 130, which for example may be a personal computer. As an example, the document processing application instance 135 may refer to a running instance of a presentation application, and the user may intend to create a new slide in a presentation document operated in the presentation application instance. In this case, according to some embodiments of the disclosure, instead of using a keyboard or mouse attached to the second client device 130 to create a new slide in the presentation document as conventionally did, the user may simply speak to the first client device 110, which for example may be a smartphone, and the voice that the user utters, e.g. "please create a new slide in PPT", is received by the input processing unit 115 on the first client device 110, e.g., with the use of a microphone. As an example, the input processing unit 115 herein may refer to a running instance of an input processing application, although the present disclosure is not limited in this aspect. The input processing unit 115 converts the user voice into one or more commands that correspond to the user voice and that are to be executed on the document processing application instance 135. Then, the one or more commands outputted by the input processing unit 115 are sent, through the network 140, to the control service 125 on the server 120.

The control service 125, which receives the one or more commands from the input processing unit 115 on the first client device 110, first finds out the document processing application instance 135 that has been paired with the input processing unit 115, and then sends, through the network 140, the received one or more commands to the document processing application instance 135 on the second client device 130.

The one or more commands are then executed on the document processing application instance 135, to perform the corresponding operations associated with the intention of the user voice, which in this non-limiting example is the creating of a new slide in the presentation document operated in the document processing application instance 135.

It could be appreciated that the first client device 110, the server 120, and the second client device 130 may be implemented by a variety of different computing devices. Examples of the computing devices may include, without limitation, a mobile device, a personal digital assistant (PDA), a wearable device, a smart phone, a cellular telephone, a handset, a messaging device, a computer, a personal computer (PC), a desktop computer, a laptop computer, a notebook computer, a handheld computer, a tablet computer, a work station, a mini-computer, a main frame computer, a supercomputer, a network appliance, a web appliance, a processor-based system, a multiprocessor system, consumer electronics, programmable consumer electronics, a television, a digital television, a set top box, or any combination thereof.

Further, while the server 120 is illustrated as a single server, it could be appreciated that it can also be implemented as a server array or a server farm, or even a cluster of different entities each configured to perform the respective functions, in some embodiments. Further, in some embodiments, the server 120 may be deployed under a distributed computing environment, and may also be implemented using cloud-computing technologies, although the present disclosure is not limited in this aspect.

Further, the network 140 may include any type of wired or wireless communication network or combinations of wired or wireless networks. Examples of communication networks include a local area network (LAN), a wide area network (WAN), a public telephone network, an Internet, an intranet, Bluetooth, and so on. In some embodiments, the network 140 may also be configured to include multiple networks, although a single network 140 is shown here.

While in the exemplary operating environment 100, the first client device 110, the server 120 and the second client device 130 are illustrated as individual devices that are separated from each other and coupled together through the network 140, other configurations are also possible according to some embodiments of the disclosure. For example, the first client device 110 and the second client device 130 may refer to the same computing device, e.g., a personal computer, which communicates with a separate server 120 through the network 140. In this case, the personal computer running a document processing application instance 135 may also be equipped with an input processing unit 140, which in one example may be an input processing application instance also running on the personal computer.

As another example, the server 120 and the second client device 130 may refer to the same computing device, which owns/runs both a control service 125 and a document processing application instance 135, and communicates through the network 140 with a separate first client device 110 having an input processing unit 115. As still another example, the first client device 110 and the server 120 may refer to the same computing device, which has both an input processing unit 115 and a control service 125, and communicates through the network 140 with a separate second client device 130 running a document processing application instance 135. As yet still another example, the first client device 110, the server 120 and the second client device 130 may all refer to a single computing device, that is, this single computing device has an input processing unit 115, a control service 125, and a document processing application instance 135. In this and other cases, the network 140, or at least portion thereof, may also refer to a bus or other signal transmission mechanism implemented within the computing device.

It should be noted that at least one of the input processing unit 115 and the control service 125 can be implemented in software, hardware, firmware, or any combination thereof.

Moreover, in some embodiments, a command that is executed on the document processing application instance 135 means that the command can be executed directly by the document processing application instance 135 itself, to perform the desired operation(s). In some other embodiments, however, it may also mean that the command received by the document processing application instance 135 is to be sent to another server (not shown herein) for execution, and later the execution result is received from the another server and is rendered on the document processing application instance 135, which for example may be the case where the document processing application instance 135 is an online/web document processing application instance. As an example, said document processing application instance 135 may refer to an instance or session of an online/web document processing application, which is initiated through for example a browser on the second client device 130, and is communicatively coupled to and controlled by the another server. In some embodiments of the disclosure, said another server is co-located with the server 120, while in some other embodiments, said another server may be located elsewhere on the network 140.

Figure 2:
FIG. 2 is a flow chart illustrating an exemplary interaction of various entities in accordance with some embodiments of the disclosure.

Turning now to FIG. 2, a flow chart illustrating an exemplary interaction 200 of various entities will be described in detail, in accordance with some embodiments of the disclosure.

As illustrated in FIG. 2, the entities may include an input processing application instance 215, a control service 225 and a document processing application instance 235. According to some embodiments of the disclosure, the input processing application instance 215, the control service 225 and the document processing application instance 235 may correspond to the input processing unit 115 on the first client device 110 in FIG. 1, the control service 125 on the server 120 in FIG. 1 and the document processing application instance 135 on the second client device 130 in FIG. 1; respectively.

In some embodiments, the document processing application instance 235 may send (250), to the control service 225, a request for identification information of the document processing application instance 235, as illustrated in the flow chart of FIG. 2.

In some embodiments, there may exist multiple instances of a document processing application that are currently running on a computing device, such as the second client device 130 (which, for example, may be a personal computer). As an example, each of the multiple document processing application instances is associated with, and is operating a different electronic document, although the present disclosure is not limited in this aspect. In some embodiments, the document processing application instances may refer to online/web document processing application instances or sessions, which for example are initiated through a browser on the computing device. In some embodiments, one of the multiple document processing application instances may be the document processing application instance 235.

In some embodiments, sending of the request for the identification information of the document processing application instance 235 may be performed once the document processing application instance 235 in which an electronic document is operated is initiated. In some alternative embodiments, the sending of the request may be performed at a different time from the above. As an example, the document processing application instance 235 may send the request whenever necessary, for example, in response to certain external/internal event(s).

In some embodiments, the control service 225, upon receipt of the request from the document processing application instance 235, may generate the identification information of the document processing application instance 235. In some embodiments, the generating of the identification information may be based on information associated with the document processing application instance 235. For example, the information associated with the document processing application instance 235 may include one or more from an identifier of the document processing application instance 235, information of a location where an electronic document operated in the document processing application instance 235 is stored, a name of the electronic document, an identifier of the electronic document, information of an account that is associated with or designated by the document processing application instance 235 and/or the electronic document operated therein, and etc. Additionally or alternatively, the information associated with the document processing application instance 235 may include various types of other information describing attributes/metadata of the document processing application instance 235 and/or the electronic document operated therein, and the present disclosure is not limited in this aspect. In some embodiments, the information associated with the document processing application instance 235 may be contained in the request that is sent from the document processing application instance 235. In some alternative embodiments, the information associated with the document processing application instance 235 may be pre-stored and held by the control service 225, or it may be retrieved by the control service 225 from other source(s), although the present disclosure is not limited in this aspect.

In some embodiments, the generated identification information of the document processing application instance 235 may be data of any type, as long as it can be used by the control service 225 to uniquely identify the document processing application instance 235. In some embodiments, the generated identification information of the document processing application instance 235 may take any of possible forms, for example, it may be a sequence number or code, a bar code, a QR Code, or the like.

In some embodiments, the generated identification information of the document processing application instance 235 may include a HostURL, a DocumentID, a DocumentName, a SessionID, and an AuthenticationToken, although the present disclosure is not limited in this aspect. In this example, the HostURL, DocumentID and DocumentName are used to identify the electronic document operated in the document processing application instance 235. The SessionID represents an identifier of the instance/session 235. Further, the AuthenticationToken is for security purposes, for example, it can be used for identify authentication of the input processing application instance 215 which will obtain, from the document processing application instance 235, the generated identification information, as will be described later. As an example, the AuthenticationToken may be used to designate that only a particular input processing application instance (e.g., associated with a particular account), which in this case may refer to the input processing application instance 215, is allowed to perform some of the operations described later, such as the sending of a pairing request as illustrated in FIG. 2 with the reference numeral 270.

As illustrated in the flow chart of FIG. 2, after the generation of the identification information of the document processing application instance 235, the control service 225 may send (255) the generated identification information back to the document processing application instance 235.

In some embodiments, upon receipt of the identification information from the control service 225, the document processing application instance 235 may store the received identification information. In some embodiments, the identification information may be displayed on the document processing application instance 235.

Later, in some embodiments, the input processing application instance 215 may obtain (260), from the document processing application instance 235, the identification information of the document processing application instance 235 that is generated by the control service 225, as illustrated in the flow chart of FIG. 2. In some embodiments, the input processing application instance 215 may be one of multiple instances of an input processing application that are currently running on a computing device, such as the first client device 110 (which, for example, may be a smartphone), although the present disclosure is not limited in this aspect.

In some embodiments, the obtaining of the identification information may include the input processing application instance 215 requesting and then receiving the identification information from the document processing application instance 235. In some alternative embodiments, the document processing application instance 235 may choose to display the identification information on its own initiative, for example upon receipt of its identification information from the control service 225. As an example, the identification information may be in the form of a QR Code. Therefore, the input processing application instance 215 may directly scan, for example with the use of a component of the computing device running the input processing application instance 215 (e.g., a camera), the QR Code being displayed on the document processing application instance 235, and thus can obtain the identification information of the document processing application instance 235 from the scanned QR Code. Other mechanisms for obtaining the identification information from the document processing application instance 235 are also possible, and the present disclosure is not limited in this aspect.

As illustrated in the flow chart of FIG. 2, in some embodiments, the input processing application instance 215 may send (270), to the control service 225, a pairing request for pairing the document processing application instance 235 with the input processing application instance 215. The pairing request may be sent to the control service 225 by the input processing application instance 215 whenever necessary. As an example, the pairing request is sent upon obtaining the identification information from the document processing application instance 235, although the present disclosure is not limited in this aspect.

In some embodiments, the pairing request may contain identification information of the input processing application instance 215. As an example, the identification information of the input processing application instance 215 includes EndPointAddress and InstanceID, wherein the EndPointAddress represents an address of the first client device 110 on which the input processing application instance 215 is running, while the InstanceID represents an identifier of the instance 215, although the present disclosure is not limited in this aspect.

In some embodiments, both the identification information of the document processing application instance 235 that is obtained by the input processing application instance 215 and the identification information of the input processing application instance 215 itself, are contained in the pairing request sent to the control service 225.

In some embodiments, in response to the pairing request from the input processing application instance 215, the control service 225 may bind the document processing application instance 235 and the input processing application instance 215 together, and the result of the binding is stored as pairing information or at least a portion thereof.

In some embodiments, the pairing information may include the identification information of the document processing application instance 235 that is stored in association with the identification information of the input processing application instance 215. In some embodiments, the pairing information may be in tabular form, or in any of similar forms. For example, the pairing information may include multiple entries, each corresponding to a particular pairing between a particular document processing application instance and a particular input processing application instance, wherein one of the multiple entries is to hold the identification information of the document processing application instance 235 that is stored in association with the identification information of the input processing application instance 215. In some embodiments, the pairing information may be held by the control service 225 directly, while in some alternative embodiments, the pairing information may be stored within a storage unit that is remote from, but accessible to the control service 225 for later use, and the present disclosure is not limited in this aspect.

In some embodiments, optionally, the control service 225 may send (275) a reply to the pairing request back to the input processing application instance 215, to indicate the success of the pairing, as illustrated in the flow chart of FIG. 2.

In some embodiments, the input processing application instance 215 may include a pairing module (not shown herein), and at least the operations of obtaining the identification information of the document processing application instance 235 from the document processing application instance 235, sending the pairing request to the control service 225 and optionally receiving the reply to the pairing request from the control service 225, as described above, may be implemented by the pairing module of the input processing application instance 215.

Therefore, with these interactions, the pairing between a particular document processing application instance 235 and a particular input processing application instance 215 is established by the control service 225. According to some embodiments of the present disclosure, with the pairing, a persistent connection between the input processing application instance 215 and the document processing application instance 235 via the control service 225 is maintained by the control service 225, which can be used to bear command(s) from the input processing application instance 215, as will be described later. According to some embodiments, the pairing between the document processing application instance 235 and the input processing application instance 215 may become invalid upon expiration of a pre-defined duration, or when one or more of the document processing application instance 235 and the input processing application instance 215 are terminated, or the like, although the present disclosure is not limited in this aspect.

In the following, a procedure of using the input processing application instance 215 to interact with the document processing application instance 235 will be described in detail.

In some embodiments, a user may utilize his voice, through the input processing application instance 215, to perform one or more operations of the document processing application instance 235.

Continuing with the previously-described example of new slide creating and under the context of FIG. 2, the user may utter a voice "please create a new slide in PPT" to the input processing application instance 215 that is running on a computing device (e.g., a smartphone), for his intention of creating a new slide in a presentation document operated in the document processing application instance 235 that is running on another computing device (e.g., a personal computer). The voice uttered by the user is inputted into the input processing application instance 215.

In some embodiments, upon receipt of the user voice, the input processing application instance 215 may process the user voice, to convert it into one or more commands that correspond to the user voice and that can be executed on the document processing application instance 235, as described before. In some embodiments, the input processing application instance 215 may include a speech recognizer (not shown herein) to recognize the user voice as plain text. In other words, in the above example, the voice signal uttered by the user is translated by the speech recognizer into a text string "please create a new slide in PPT", for further processing.

In some embodiments, the input processing application instance 215 may, further include a natural language processor (not shown herein). The natural language processor takes the plain text from the speech recognizer as an input and translates it into command information with well-defined semantics. In some embodiments, the command information may be in a specific form or format. Continuing with the above example, in this case, the command information may take the form like: "PPT:newslide", although the present disclosure is not limited in this aspect.

In some embodiments, the input processing application instance 215 may, further include a command translator (not shown herein), which generates one or more commands that are to be executed on the document processing application instance 235, based on the command information from the natural language processor. For example, the command information "PPTnewslide" from the natural language processor is translated by the command translator into a command "CreateSlide", which is a standard command that can be executed on the document processing application instance 235 for the presentation document operated therein. In some embodiments, the translation may be based on a configuration file that is held by the input processing application instance 215. It could be appreciated that this command example is for the purpose of illustration only, and the present disclosure is not limited in this aspect.

It should be noted that, although the input processing application instance 215 is described herein as including the speech recognizer, the natural language processor and the command translator, one or more of these components may be combined or omitted. For example, in some embodiments, the command translator may be omitted and therefore the natural language processor may generate the one or more commands directly, although the present disclosure is not limited in this aspect.

Then, as illustrated in the flow chart of FIG. 2, the input processing application instance 215 may send (280), to the control service 225, the generated one or more commands for performing one or more operations of the document processing application instance 235, which in this example is specifically to create a new slide in the presentation document operated in the document processing application instance 235.

In some embodiments, the input processing application instance 215 may include a communication module (not shown herein), and at least the operation of sending the generated one or more commands to the control service 225, as described above, may be implemented by the communication module of the input processing application instance 215.

In some embodiments, upon receipt of the one or more commands, the control service 225 may identify, through checking pairing information, the document processing application instance 235 that is paired with the input processing application instance 215 from which the one or more commands are sent. As described before, in some embodiments, the pairing information, or at least a portion thereof, is generated by the control service 225 in response to the pairing request from the input processing application instance 215, and the pairing information may be held by the control service 225, or it may be stored in a remote storage unit accessible to the control service 225. In some embodiments, after the one or more commands are received from the input processing application instance 215, the pairing information may be traversed by the control service 225 in order to locate one of a plurality of entries contained therein, which holds the identification information of the document processing application instance 235 that is stored in association with the identification information of the input processing application instance 215 from which the one or more commands are sent, and thereby the document processing application instance 235 is identified, although the present disclosure is not limited in this aspect.

In some embodiments, once the document processing application instance 235 that is paired with the input processing application instance 215 is identified by the control service 225 according to the pairing information, the control service 225 may send (290) the received one or more commands to the identified document processing application instance 235, as illustrated in the flow chart of FIG. 2.

In other words, the one or more commands converted from the user voice are sent from the input processing application instance 215 to the document processing application instance 235 via the control service 225, on a persistent connection maintained by the control service 225 with the use of the pairing information, as described before.

The one or more commands, after received by the document processing application instance 235 from the control service 225, are then executed on the document processing application instance 235 to perform the one or more operations thereof. In the above command example of "CreateSlide", a new slide is created in the presentation document operated in the document processing application instance 235.

Consider another example where the user may intend to insert a picture of an apple into the current slide in the presentation document operated in the document processing application instance 235. In this case, the user may simply speak "please insert a picture of apple in this slide" to the input processing application instance 215, which in turn converts the user voice into a command, such as "InsertImage("apple")" that is to be executed on the document processing application instance 235 for the presentation document operated therein. The command is sent to the control service 225, which then identifies the document processing application instance 235 that is paired with the input processing application instance 215 and sends the command to the identified document processing application instance 235 for execution. In some embodiments, for example, the execution of this command on the document processing application instance 235 may include retrieving a picture of an apple from a third party resource (e.g., a search engine) that is directly or indirectly accessible to the document processing application instance 235 and then inserting the retrieved apple picture into the current slide in the presentation document operated in the document processing application instance 235.

Therefore, the voice control of operations of document processing application instances is achieved according to some embodiments of the present disclosure, which could benefit users especially under certain scenarios where conventional controlling manners are difficult to use or even infeasible, thus improving convenience and efficiency of these operations.

It should be noted that the interaction 200 is described by reference to the flow chart of FIG. 2 for the purpose of illustration only, and not every one of the operations 250-290 described herein is necessary for implementing a specific embodiment of the present disclosure. It should also be noted that the interaction 200 may include, additionally or alternatively, one or more other operations than those described herein.

In some embodiments, upon receipt of the pairing request for pairing the document processing application instance 235 with the input processing application instance 215, which is sent (270) by the input processing application instance 215, the control service 225 may first check if the identification information of document processing application instance 235, which is generated by the control service 225 in response to the request for the identification information that is sent (250) by the document processing application instance 235, is contained in the pairing request. If it is determined that the pairing request contains the identification information of document processing application instance 235, then the control service 225 may proceed to bind the document processing application instance 235 and the input processing application instance 215 and store the result of the binding as pairing information, as described before. Otherwise, the pairing request from the input processing application instance 215 is rejected. In this case, optionally, the reply to the pairing request sent (275) back to the input processing application instance 215 may be used to indicate the rejection of the pairing request.

In some embodiments, instead of sending (280) to the control service 225 the generated one or more commands for performing one or more operations of the document processing application instance 235 as described above, the input processing application instance 215 may choose to send command information to the control service 225. In some embodiments, the command information may have well-defined semantics. As an example, the command information may be generated by a component of the input processing application instance 215, such as the above-described natural language processor which takes as an input the plain text from the speech recognizer of the input processing application instance 215, wherein a voice uttered by a user and received by the input processing application instance 215 is recognized by the speech recognizer as the plain text, as described before. In this case, the command information from the input processing application instance 215 corresponds to the user voice. For example, in the case where the user utters a voice "please create a new slide in PPT" to the input processing application instance 215, the command information may take the form like: "PPT:newslide" as described before, although the present disclosure is not limited in this aspect.

In some embodiments, the command information may not be in a specific form or format. In some embodiments, the command information from the input processing application instance 215 may be the plain text, which for example is outputted by the speech recognizer of the input processing application instance 215. In some embodiments, the command information from the input processing application instance 215 may be the voice input that is received by the input processing application instance 215.

Further, although the above disclosure is discussed in connection with voice input to the input processing application instance 215, various other types of inputs are also possible to be used to remotely control operations of the document processing application instance 235. In some embodiments, such inputs may include, without limitation, a gesture made by a user, an eye movement made by a user, a brain wave from a user, and etc. In this case, the command information from the input processing application instance 215 may be in correspondence with one or more of a voice input, a gesture input, an eye movement input, or a brain wave input. In some embodiments, the command information may be the voice input, the gesture input, the eye movement input, and/or the brain wave input per se, or it may also be any data that is generated by the input processing application instance 215 or one or more components thereof based on the voice input, the gesture input, the eye movement input, and/or the brain wave input. As an example, a user may wave his hand to draw a circle in the air, and such a gesture is captured by the input processing application instance 215, and may be directly used as the command information to be sent to the control service 225. Alternatively, the input processing application instance 215 may process the captured gesture, to generate information (such as text) that describes the gesture, and send the generated information as the command information to the control service 225. The present disclosure is not limited in this aspect.

Upon receipt of the command information, the control service 225 may identify, through checking the pairing information, the document processing application instance 235 that is paired with the input processing application instance 215 from which the command information is sent. Then, the control service 225 may send the command information to the identified document processing application instance 235, instead of sending (290) the received one or more commands to the identified document processing application instance 235 as described before.

After receiving the command information from the control service 225, the document processing application instance 235 or any entity associated therewith may generate, based on the command information, one or more commands that are to be executed on the document processing application instance 235 to perform the one or more operations thereof, in order to fulfill the intention of the user, which in the above example is to create a new slide in a presentation document operated in the document processing application instance 235. In some embodiments, the generating of the one or more commands may include analyzing the received command information to identify a series of operations/functions, and translating the identified series of operations into corresponding one or more commands that can be executed on the document processing application instance 235. Continuing with the above example, a command thus generated may be "CreateSlide" or the like, which is then executed on the on the document processing application instance 235 and accordingly, a new slide is created in the presentation document operated in the document processing application instance 235. In some embodiments, the generating of the one or more commands may be based on one or more from available application programming interfaces (APIs) of the document processing application instance 235, command specification of the document processing application instance 235, capability information of the document processing application instance 235, and the like, although the present disclosure is not limited in this aspect.

Therefore, in some embodiments in which the one or more commands are generated on the document processing application instance 235 where the generated one or more commands are then to be executed, the input processing application instance 215 which receives voices uttered by the user is not required to know some specifics or particular requirements of the document processing application instance 235 which the user is intended to control, such as the API of the document processing application instance 235, and the like. Moreover, with such configurations, more complex control on the document processing application instance 235 is possible to be implemented.

Figure 3:
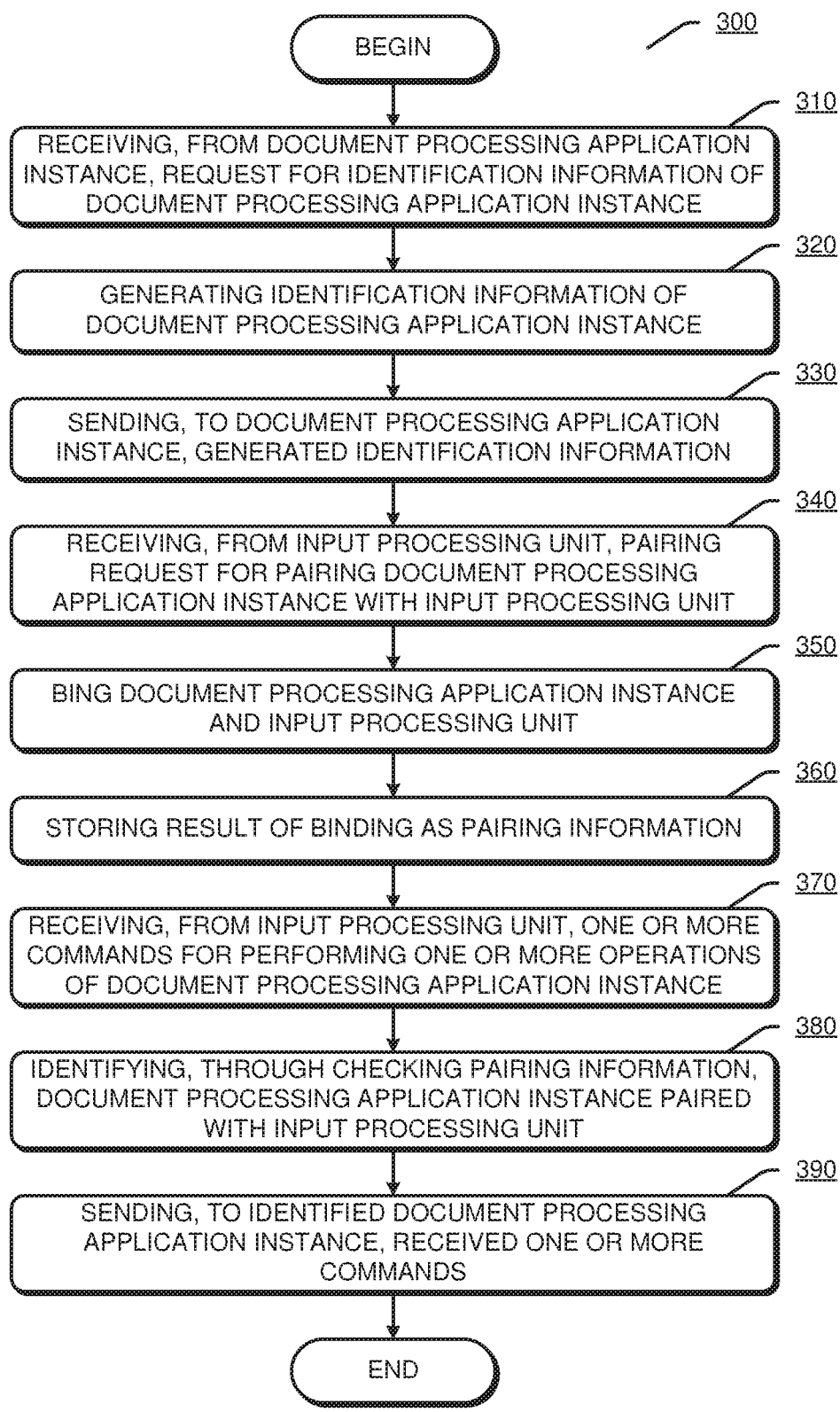
FIG. 3 is a flow chart of an exemplary method in accordance with some embodiments of the disclosure.

FIG. 3 illustrates a flow chart of an exemplary method 300 in accordance with some embodiments of the present disclosure. For example, the method 300 may be implemented on the control service 125 illustrated in FIG. 1, the control service 225 in FIG. 2, or any similar or relevant entity(s).

The exemplary method 300 begins with Step 310, where a request for identification information of the document processing application instance is received from a document processing application instance (e.g., the document processing application instance 135 illustrated in FIG. 1, or the document processing application instance 235 in FIG. 2). In some embodiments, the request is sent by the document processing application instance once it is initiated.

Then, the method 300 proceeds to Step 320. In this step, in response to the received request, the identification information of the document processing application instance is generated. In some embodiments, the generated identification information includes an authentication token, although the present disclosure is not limited in this aspect.

In Step 330, the identification information of the document processing application instance generated in Step 320 is sent to the document processing application instance. In some embodiments, the identification information of the document processing application instance may take the form of a QR Code, although the present disclosure is not limited in this aspect.

In Step 340, a pairing request is received from an input processing unit (e.g., the input processing unit 115 illustrated in FIG. 1, or the input processing application instance 215 in FIG. 2). The pairing request is to request pairing of the document processing application instance with the input processing unit.

In some embodiments, the pairing request is sent by the input processing unit upon obtaining, from the document processing application instance, the identification information of the document processing application instance which is generated in Step 330 as described before. For example, in case where the identification information of the document processing application instance is in the form of a QR Code, the input processing unit may scan the QR Code that is displayed on the document processing application instance and thus may obtain the identification information of the document processing application instance. In some embodiments, the pairing request may contain the identification information of the document processing application instance that is obtained by the input processing unit and identification information of the input processing unit itself, although the present disclosure is not limited in this aspect.

Then, in response to the received pairing request, the document processing application instance and the input processing unit are bounded, in Step 350.

In Step 360, the result of the binding is stored as pairing information. In some embodiments, the pairing information contains the identification information of the document processing application instance and the identification information of the input processing unit. More or less information than those described herein may be contained in the pairing information, and the present disclosure is not limited in this aspect.

In some embodiments, in Step 370, one or more commands are received from the input processing unit. The one or more command are to be executed on the document processing application instance in order for performing one or more operations of thereof. In some embodiments, the one or more commands are to control the presentation and/or editing of an electronic document operated in the document processing application instance, although the present disclosure is not limited in this aspect.

In some embodiments, the one or more commands from the input processing unit correspond to a voice uttered by a user and inputted to the input processing unit. In some embodiments, the user voice is firstly recognized by the input processing unit as plain text, which is then translated by the input processing unit into command information, and then the one or more commands to be executed on the document processing application instance are generated by the input processing unit based on the command information, although the present disclosure is not limited in this aspect.

After the one or more commands are received from the input processing unit, the document processing application instance that is paired with the input processing unit is identified through checking of pairing information, in Step 380. In some embodiments, the pairing information is traversed in order to locate one of a plurality of entries contained therein, which for example holds the identification information of the document processing application instance that is stored in association with the identification information of the input processing unit from which the one or more commands are sent, and thereby the document processing application instance is identified, although the present disclosure is not limited in this aspect.

Then, in Step 390, the received one or more commands are sent to the document processing application instance identified in Step 380. The one or more commands are then executed on the document processing application instance, to perform the one or more operations thereof. The method 300 may finish after Step 390.

Although the exemplary method 300 is illustrated to finish after Step 390, other implementations are also possible. In some embodiments, for example, the operations in Steps 370-390 may be performed iteratively, each iteration being for each set of one or more commands from the input processing unit, so long as the pairing between the document processing application instance and the input processing unit as indicated by the pairing information generated in Step 360 is valid. The present disclosure is not limited in this aspect.

In some alternative embodiments, a judging step may be added between Step 340 and Step 350. More specifically, after the pairing request is received from the input processing unit, a judgement is made on whether the identification information of document processing application instance, which is generated in Step 320 as described before, is contained in the received pairing request. If the pairing request contains the identification information of document processing application instance generated in Step 320, the method 300 proceeds to Step 350, where the document processing application instance and the input processing unit are bounded. Otherwise, the method 300 may finish, without performing the following Steps 350-390.

Figure 4:
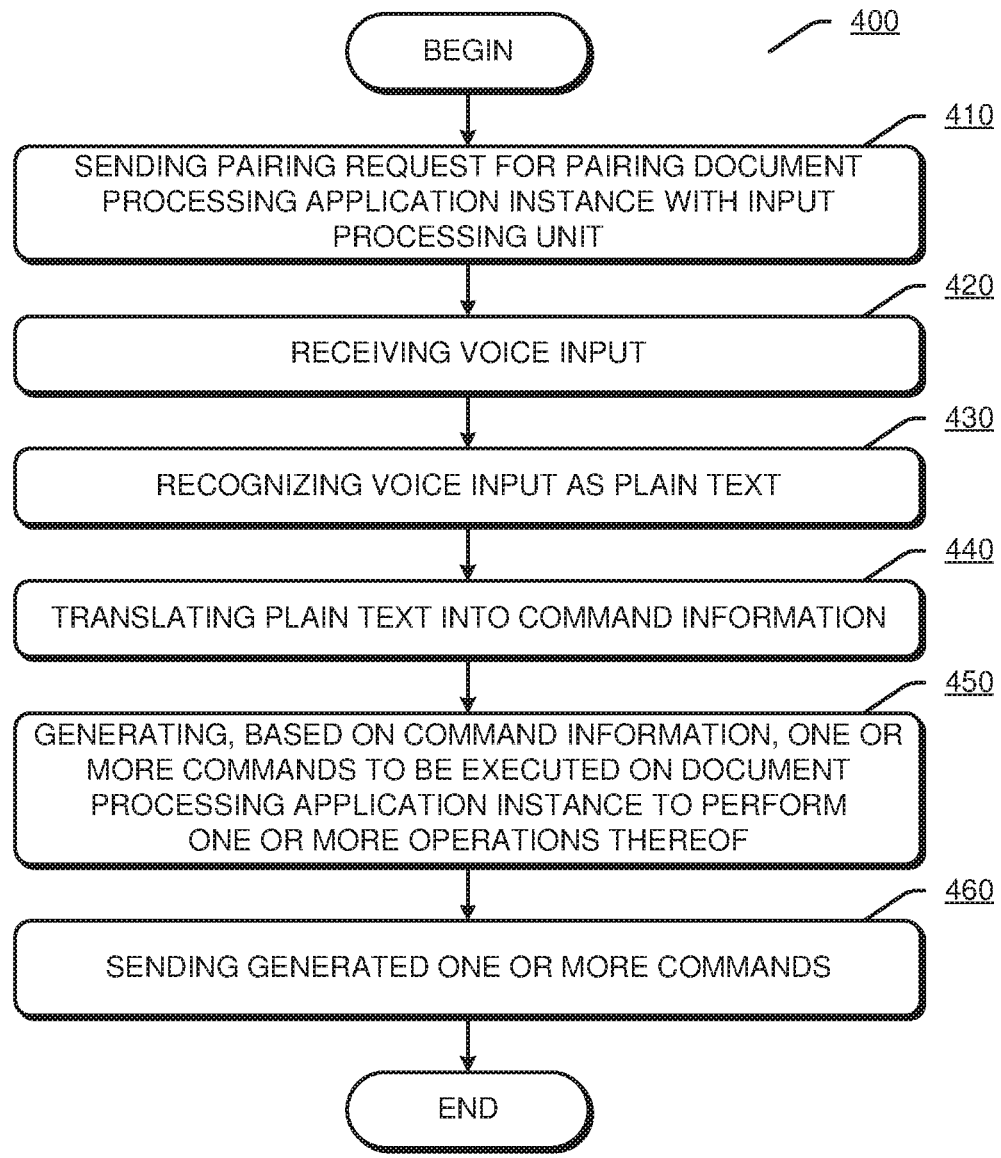
FIG. 4 is a flow chart of an exemplary method in accordance with some embodiments of the disclosure.

FIG. 4 illustrates a flow chart of an exemplary method 400 in accordance with some embodiments of the present disclosure. For example, the method 400 may be implemented on the input processing unit 115 illustrated in FIG. 1, the input processing application instance 215 in FIG. 2, or any similar or relevant entity(s).

The exemplary method 400 begins with Step 410, where a pairing request is sent. In some embodiments, the pairing request is sent to a control service (e.g., the control service 125 illustrated in FIG. 1, or the control service 225 in FIG. 2). The pairing request is to request pairing of a document processing application instance (e.g., the document processing application instance 135 illustrated in FIG. 1, or the document processing application instance 235 in FIG. 2) with the input processing unit. In some embodiments, upon receipt of the pairing request, the control service may bind the document processing application instance and the input processing unit, and store the result of the binding as pairing information, as described before.

In Step 420, a voice input is received. For example, a user may utter a voice, which is received by the input processing unit, wherein the voice input from the user reflects his intention of performing one or more operations of the document processing application instance.

Then in Step 430, the voice input is recognized as plain text. In some embodiments, one component of the input processing unit may be used to perform the recognizing operation, such as a speech recognizes as described before.

The method 400 proceeds to Step 440, where the plain text is translated into command information. In some embodiments, the translating operation may be performed by one component of the input processing unit, such as a natural language processor as described before.

In Step 450, one or more commands to be executed on the document processing application instance to perform one or more operations thereof are generated, based on the command information. In some embodiments, one component of the input processing unit may be used to perform the generating operation, such as a command translator as described before.

The method 400 proceeds to Step 460. In this step, the one or more commands generated in Step 450 are sent. Then, the method 400 may finish. In some embodiments, the one or more commands are sent to the control service. In some embodiments, upon receipt of the one or more commands, the control service may identify, through checking the pairing information, the document processing application instance that is paired with the input processing unit from which the one or more commands are sent, and may then send the received one or more commands to the identified document processing application instance for execution, as described before.

Figure 5:
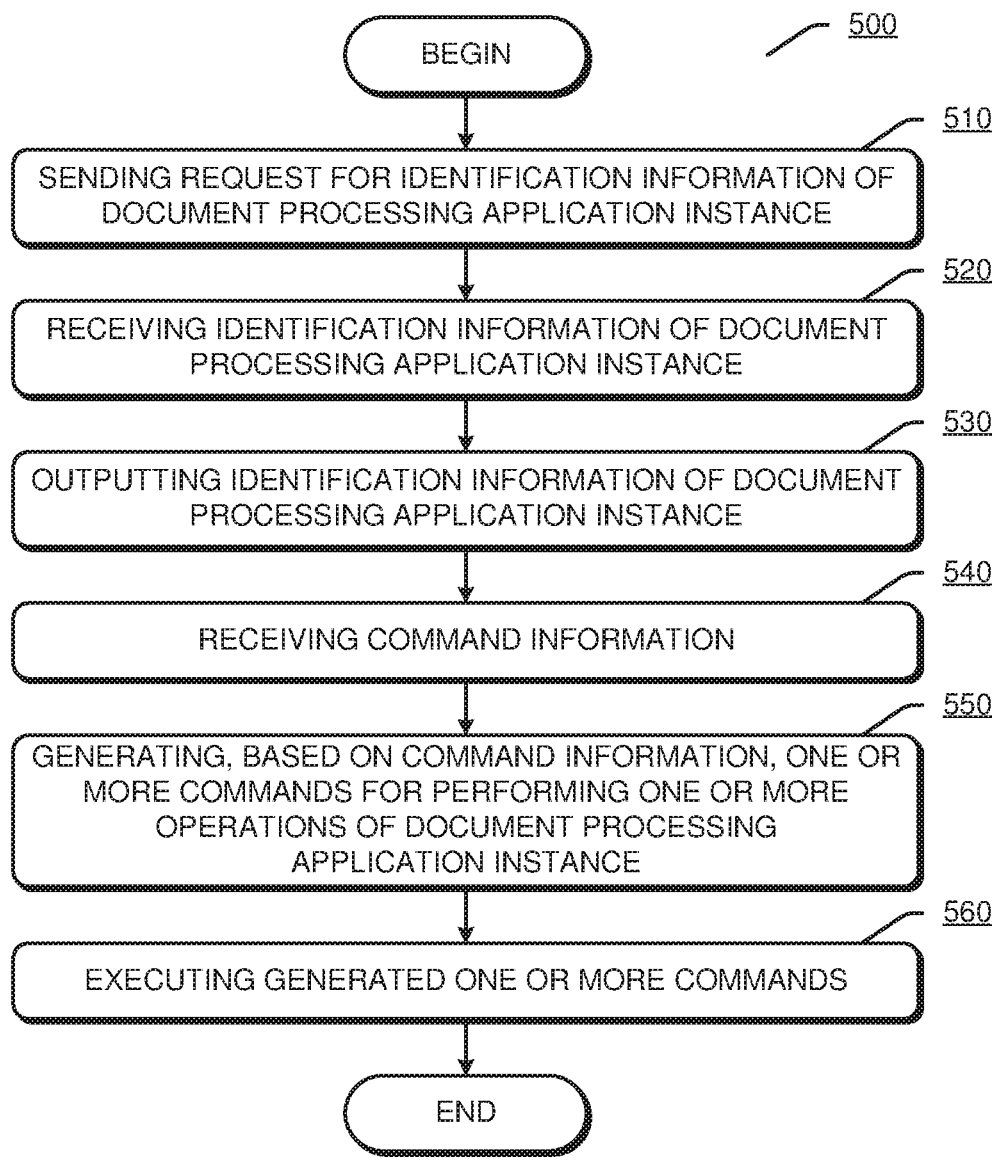
FIG. 5 is a flow chart of an exemplary method in accordance with some embodiments of the disclosure.

FIG. 5 illustrates a flow chart of an exemplary method 500 in accordance with some embodiments of the present disclosure. For example, the method 500 may be implemented on the document processing application instance 135 illustrated in FIG. 1, the document processing application instance 235 in FIG. 2, or any similar or relevant entity (s).

The exemplary method 500 begins with Step 510, where a request for identification information of the document processing application instance is sent. In some embodiments, the request is sent to a control service (e.g., the control service 125 illustrated in FIG. 1, or the control service 225 in FIG. 2). In some embodiments, the request may be sent by the document processing application instance once it is initiated, as described before.

Then, in Step 520, the identification information of the document processing application instance is received. In some embodiments, the identification information is received from the control service, which generates the identification information as a response to the request sent from the document processing application instance in Step 510. In some embodiments, the identification information of the document processing application instance may take the form of a QR code.

The method 500 then proceeds to Step 530. In this step, the identification information of the document processing application instance is outputted. It could be appreciated that the specific manners of outputting the identification information of the document processing application instance may vary in different embodiments. For example, in some embodiments, the identification information (such as a QR code) may be displayed, and thus an input processing unit (e.g., the input processing unit 115 illustrated in FIG. 1, or the input processing application instance 215 in FIG. 2) may obtain the displayed identification information of the document processing application instance through a scanning mechanism, such as a camera. In some embodiments, the identification information of the document processing application instance may be sent to the input processing unit via wired and/or wireless connection. In some embodiments, the identification information of the document processing application instance obtained by the input processing unit may be used in pairing of the document processing application instance with the input processing unit, which for example is implemented by the control service upon receipt of a pairing request from the input processing unit.

In Step 540, command information is received. In some embodiments, the command information is received from the control service. In some embodiments, the command information is generated by the input processing unit. The input processing unit sends the command information to the control service, which in turn identifies, through checking the pairing information, the document processing application instance that is paired with the input processing unit and then sends the command information to the identified document processing application instance. The command information may reflect the intention of a user of the input processing unit to perform one or more operations of the document processing application instance, e.g., creating a new slide in a presentation document operated in the document processing application instance. In some embodiments, the command information from the input processing unit corresponds to a voice input to the input processing unit. In some embodiments, the command information has well-defined semantics.

Then, in Step 550, one or more commands are generated based on the command information, for performing one or more operations of the document processing application instance. In some embodiments, the generating of the one or more commands may include analyzing the received command information to identify a series of operations/functions to be performed, and then translating the identified series of operations into corresponding one or more commands that can be executed on the document processing application instance, although the present disclosure is not limited in this aspect.

In Step 560, the generated one or more commands are executed. For example, as the result of the execution of the one or more commands on the document processing application instance, a new slide is created in the presentation document operated in the document processing application instance, thus the intention of the user is fulfilled. Then, the method 500 may finish.

It could be appreciated that, although the operations of each of the exemplary methods 300-500 are shown in a sequential order, some of the operations may be performed simultaneously, in parallel, or in a different order. It should also be noted that the methods 300-500 are merely exemplary and not limiting, and not every operation described herein is necessary for implementing a specific embodiment of the present disclosure. In some embodiments, each of the methods 300-500 may include other actions that have been described in the description, e.g., with reference to the exemplary interaction 200. It should also be noted that the various operations of the exemplary methods 300-500 may be implemented in software, hardware, firmware, or any combination thereof.

While the above disclosure is discussed mainly in connection with voice input to the input processing unit, various other types of inputs are also possible to be used to remotely control operations of document processing application instances, which may as well benefit users and improve convenience and efficiency of these operations, according to some embodiments of the present disclosure. In some embodiments, such inputs may also include, without limitation, a gesture made by a user, an eye movement made by a user, a brain wave from a user, and etc. In this case, the input processing unit or similar entity(s) may take one or more of the following as the input and output the corresponding command information/command(s): the voice, the gesture, the eye movement, the brain wave, or the like.

Figure 6:
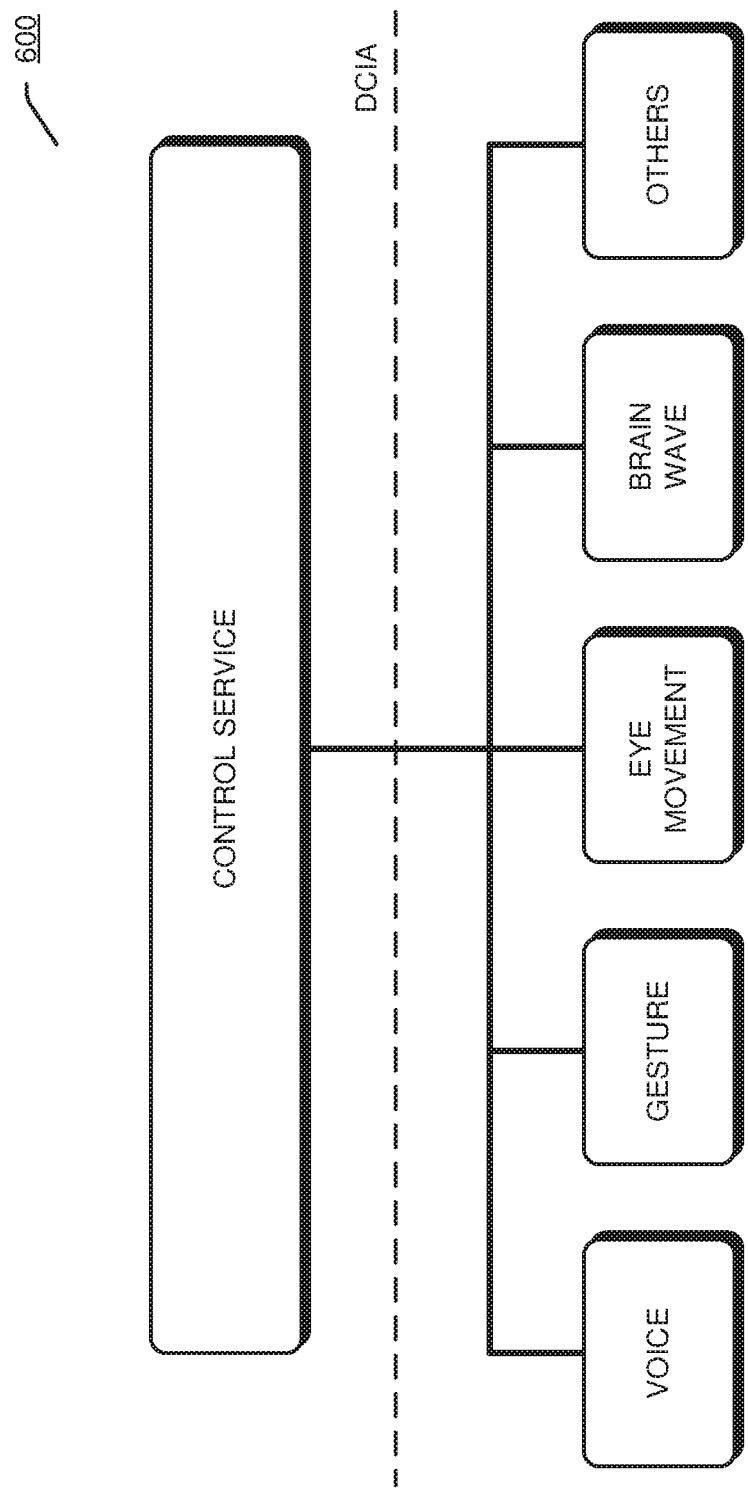
FIG. 6 illustrates an exemplary architecture in accordance with some embodiments of the disclosure.

FIG. 6 illustrates an exemplary architecture 600 in accordance with some embodiments of the disclosure. In some embodiments, a set of Document Common Interaction APIs (DCIA) is implemented for a document processing application or a set of document processing applications and provided to the input processing unit or similar entity(s) that can process various external inputs, for better communication/control on document processing application instances. In this case, no matter what types of inputs that the input processing unit or similar entity(s) may have (e.g., voice, gesture, eye movement, and/or brain wave), one or more commands sent from the input processing unit or similar entity(s) to the document processing application instances via the control service always follow the specification of the DCIA.

Further, although the above disclosure is discussed mainly with reference to document processing applications/document processing application instances, the inventive concept described herein may also be applied to any type of applications or instances thereof, which may as well benefit users and improve convenience and efficiency of the operations associated with various application instances.

Figure 7:
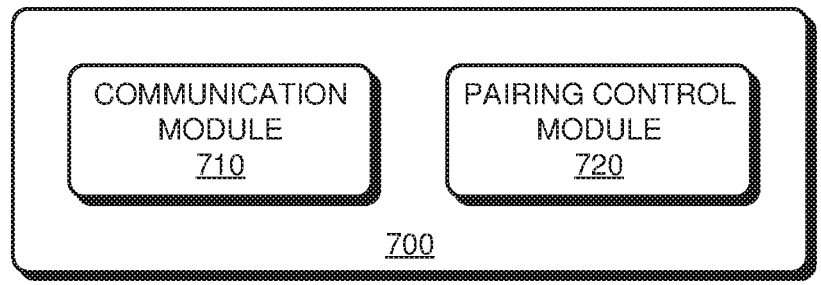
FIG. 7 is a block diagram of an exemplary apparatus in accordance with some embodiments of the disclosure.

FIG. 7 is a block diagram of an exemplary apparatus 700 in accordance with some embodiments of the disclosure. For example, the apparatus 700 may be implemented in the control service 125 illustrated in FIG. 1, the control service 225 in FIG. 2, or any similar or relevant entity(s).

The apparatus 700 may comprise a communication module 710 which is configured to receive, from an input processing unit, one or more commands for performing one or more operations of an application instance. The apparatus 700 may further comprise a pairing control module 720 which is configured to identify, through checking pairing information, the application instance that is paired with the input processing unit. The communication module 710 may be further configured to send the received one or more commands to the identified application instance, for execution on the application instance to perform the one or more operations.

In some embodiments, the pairing control module 720 may be further configured to receive, from the application instance, a request for identification information of the application instance. In response to the request, the pairing control module 720 may generate the identification information of the application instance. The pairing control module 720 may then send the generated identification information to the application instance.

In some embodiments, the pairing control module 720 may be further configured to receive, from the input processing unit, a pairing request for pairing the application instance with the input processing unit. In response to the pairing request, the pairing control module 720 may bind the application instance and the input processing unit, and store the result of the binding as the pairing information.

Figure 8:
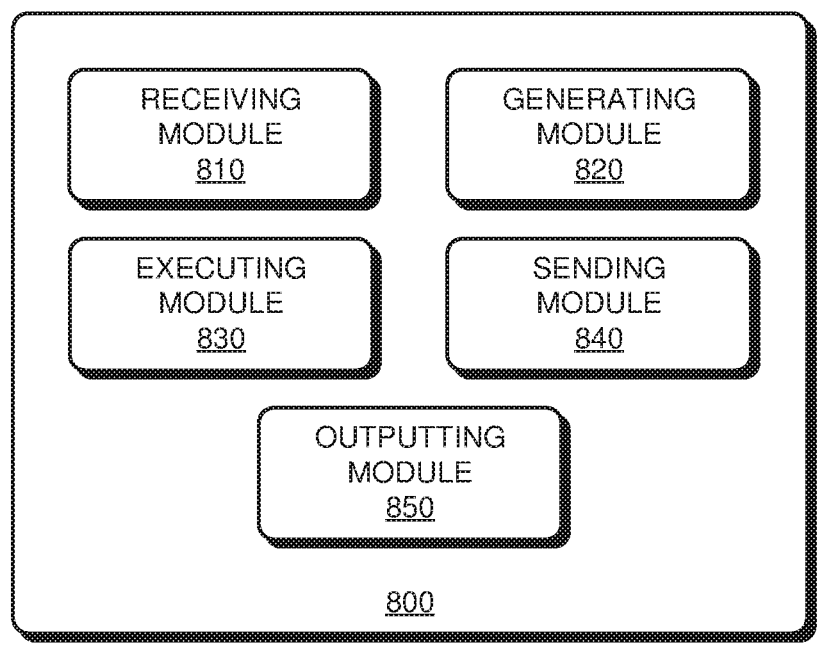
FIG. 8 is a block diagram of an exemplary apparatus in accordance with some embodiments of the disclosure.

FIG. 8 is a block diagram of an exemplary apparatus 800 in accordance with some embodiments of the disclosure. For example, the apparatus 800 may be implemented in the document processing application instance 135 illustrated in FIG. 1, the document processing application instance 235 in FIG. 2, or any similar or relevant entity(s).

The apparatus 800 may comprise a receiving module 810 which is configured to receive command information. The apparatus 800 may further comprise a generating module 820 which is configured to generate, based on the command information, one or more commands for performing one or more operations of an application instance. The apparatus 800 may further comprise an executing module 830 which is configured to execute the generated one or more commands, to perform the one or more operations of the application instance.

In some embodiments, the apparatus 800 may further comprise a sending module 840 which is configured to send a request for identification information of the application instance. The receiving module 810 may be further configured to receive the identification information of the application instance. The apparatus 800 may further comprises an outputting module 850 which is configured to output the identification information of the application instance.

Each of the exemplary apparatus 700 and the exemplary apparatus 800 may be implemented by software, hardware, firmware, or any combination thereof. It could be appreciated that although the apparatus 700 is illustrated to contain modules 710 and 720, and the apparatus 800 is illustrated to contain module 810-850, more or less modules may be included in each of the apparatuses. For example, the communicating module 710 and/or the pairing control module 720 illustrated in FIG. 7 may be separated into different modules each to perform at least a portion of the various operations described herein. For example, one or more of the modules 810-850 illustrated in FIG. 8 may be combined, rather than operating as separate modules. For example, each of the apparatus 700 and the apparatus 800 may comprise other modules, or its existing one or more modules may be further configured to perform other actions that have been described in the description.

Figure 9:
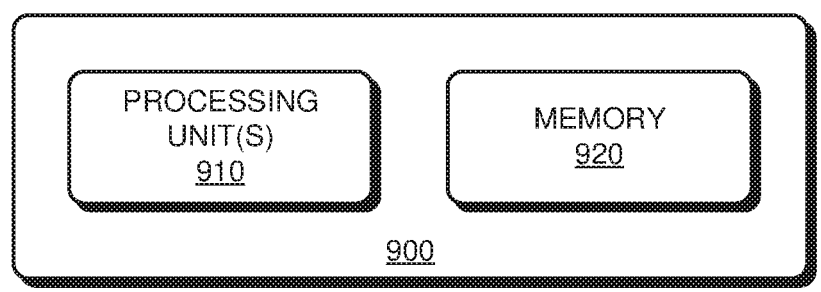
FIG. 9 is a block diagram of an exemplary computing device in accordance with some embodiments of the disclosure.

Turning now to FIG. 9, a block diagram of an exemplary computing device 900 in accordance with some embodiments of the disclosure is illustrated. As illustrated herein, the computing device 900 may comprise one or more processing units 910 and a memory 920. The one or more processing units 910 may include any type of general-purpose processing units/cores (for example, but not limited to CPU, GPU), or application-specific processing units, cores, circuits, controllers or the like. The memory 920 may include any type of medium that may be used to store data. The memory 920 is configured to store instructions that, when executed, cause the one or more processing units 910 to perform operations of any method described herein, e.g., the exemplary method 300, the exemplary method 400, the exemplary method 500, or the like.

Various embodiments described herein may include, or may operate on, a number of components, elements, units, modules, instances, or mechanisms, which may be implemented using hardware, software, firmware, or any combination thereof. Examples of hardware may include, but not be limited to, devices, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor devices, chips, microchips, chip sets, and so forth. Examples of software may include, but not be limited to, software components, programs, applications, computer programs, application programs, system programs, machine programs, operating system software, middleware, software modules, routines, subroutines, functions, methods, procedures, software interfaces, application programming interfaces (API), instruction sets, computer code, computer code segments, words, values, symbols, or any combination thereof. Determining whether an embodiment is implemented using hardware, software and/or firmware may vary in accordance with any number of factors, such as desired computational rate, power levels, heat tolerances, processing cycle budget, input data rates, output data rates, memory resources, data bus speeds and other design or performance constraints, as desired for a given embodiment.

Some embodiments described herein may comprise an article of manufacture. An article of manufacture may comprise a storage medium. Examples of storage medium may include volatile and nonvolatile, removable and non-removable media implemented in any method or technology for storage of information, such as computer readable instructions, data structures, program modules, or other data. Storage medium may include, but not be limited to, random-access memory (RAM), read-only memory (ROM), programmable read-only memory (PROM), erasable programmable read-only memory (EPROM), electrically erasable programmable read-only memory (EEPROM), flash memory or other memory technology, compact disc (CD), digital versatile disk (DVD) or other optical storage, magnetic cassette, magnetic tape, magnetic disk storage or other magnetic storage devices, or any other medium which can be used to store information. In some embodiments, an article of manufacture may store executable computer program instructions that, when executed by one or more processing units, cause the processing units to perform operations described herein. The executable computer program instructions may include any suitable type of code, such as source code, compiled code, interpreted code, executable code, static code, dynamic code, and the like. The executable computer program instructions may be implemented using any suitable high-level, low-level, object-oriented, visual, compiled and/or interpreted programming language.

Some embodiments of the present disclosure described herein are listed below.

According to an embodiment of the disclosure, a method is provided. The method comprises: receiving, from an input processing unit; one or more commands for performing one or more operations of an application instance; identifying, through checking pairing information, the application instance that is paired with the input processing unit; and sending, to the identified application instance, the received one or more commands.

In an embodiment, the pairing information contains identification information of the application instance and identification information of the input processing unit.

In an embodiment, the application instance comprises a document processing application instance.

In an embodiment, the one or more commands are to control the presentation and/or editing of an electronic document operated in the document processing application instance.

In an embodiment, the method further comprises: receiving; from the application instance, a request for identification information of the application instance; generating, in response to the request, the identification information of the application instance; and sending, to the application instance, the generated identification information.

In an embodiment, the identification information of the application instance comprises an authentication token.

In an embodiment, the method further comprises: receiving, from the input processing unit, a pairing request for pairing the application instance with the input processing unit; binding, in response to the pairing request; the application instance and the input processing unit; and storing the result of the binding as the pairing information.

In an embodiment, the pairing request contains the identification information of the application instance obtained by the input processing unit and identification information of the input processing unit.

In an embodiment, wherein the application instance is a web application instance.

In an embodiment, the one or more commands are in correspondence with one or more of: a voice input, a gesture input, an eye movement input, or a brain wave input.

In an embodiment, the method further comprises: recognizing, through the input processing unit, the voice input as plain text; translating, through the input processing unit, the plain text into command information; and generating, through the input processing unit, the one or more commands based on the command information.

According to an embodiment of the disclosure, a method is provided. The method comprises: receiving command information; generating, based on the command information, one or more commands for performing one or more operations of an application instance; and executing the generated one or more commands.

In an embodiment, the method further comprises: sending a request for identification information of the application instance; receiving the identification information of the application instance; and outputting the identification information of the application instance.

In an embodiment, the identification information of the application instance comprises an authentication token.

In an embodiment, the outputted identification information is to be obtained by an input processing unit and used for pairing up with the input processing unit.

In an embodiment, the command information is generated by the input processing unit.

In an embodiment, the command information is in correspondence with one or more of: a voice input, a gesture input, an eye movement input, or a brain wave input.

In an embodiment, the application instance is a document processing application instance, and the one or more commands are to control the presentation and/or editing of an electronic document operated in the document processing application instance.

According to an embodiment of the disclosure, an apparatus is provided. The apparatus comprises: a receiving module configured to receive command information; a generating module configured to generate, based on the command information, one or more commands for performing one or more operations of an application instance; and an executing module configured to execute the generated one or more commands.

In an embodiment, the apparatus further comprises a sending module configured to send a request for identification information of the application instance, wherein the receiving module is further configured to receive the identification information of the application instance, and wherein the apparatus further comprises an outputting module configured to output the identification information of the application instance.

According to an embodiment of the disclosure, a method is provided. The method comprises: sending a pairing request for pairing an application instance with an input processing unit; receiving a voice input; recognizing the voice input as plain text; translating the plain text into command information; generating; based on the command information, one or more commands to be executed on the application instance to perform one or more operations of the application instance; and sending the generated one or more commands.

According to an embodiment of the disclosure, an apparatus is provided. The apparatus comprises: a communication module configured to receive, from an input processing unit, one or more commands for performing one or more operations of an application instance; and a pairing control module configured to identify, through checking pairing information, the application instance paired with the input processing unit, wherein the communication module is further configured to send, to the identified application instance, the received one or more commands.

In an embodiment, the pairing control module is further configured to: receive, from the application instance, a request for identification information of the application instance; generate, in response to the request, the identification information of the application instance; and send, to the application instance, the generated identification information.

In an embodiment, the pairing control module is further configured to: receive, from the input processing unit, a pairing request for pairing the application instance with the input processing unit; bind, in response to the pairing request, the application instance and the input processing unit; and store the result of the binding as the pairing information.

According to an embodiment of the disclosure, a computing device is provided. The computing device comprises: one or more processing units; and a memory storing instructions that, when executed, cause the one or more processing units to perform operations of any method described herein.

According to an embodiment of the disclosure, a non-transitory tangible computer-readable storage medium is provided. The storage medium has instructions stored thereon, the instructions, when executed on at least one processing unit, causing the at least one processing unit to perform operations of any method described herein.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A method comprising:
    receiving, from an application instance presently executing on a computing device, a request for identification information of the application instance;
    generating, in response to the request, the identification information of the application instance;
    sending, to the application instance, the generated identification information;
    receiving, from an input processing unit, a pairing request including the generated identification information for pairing the application instance with the input processing unit;
    binding, in response to the pairing request, the application instance and the input processing unit;
    storing a result of the binding as pairing information;
    establishing a persistent connection between the application instance and an instance of the input processing unit using the pairing information;
    receiving, from the input processing unit, one or more commands for performing one or more operations of the application instance, wherein the one or more commands are received in command data output from the instance of the input processing unit based on user input received via the input processing unit;
    identifying, through checking the pairing information, that the application instance paired with the input processing unit is associated with the one or more commands;
    converting the one or more commands into application instance specific computing instructions for execution of the one or more operations; and
    sending, to the identified application instance, the application instance specific computing instructions for execution of the one or more operations.

2. The method of claim 1, wherein the pairing information contains identification information of the application instance and identification information of the input processing unit.

3. The method of claim 1, wherein the application instance comprises a document processing application instance.

4. The method of claim 3, wherein the one or more commands are to control the presentation and/or editing of an electronic document operated in the document processing application instance.

5. The method of claim 1, wherein the identification information of the application instance comprises an authentication token.

6. The method of claim 1, wherein the pairing request contains the identification information of the application instance obtained by the input processing unit and identification information of the input processing unit.

7. The method of claim 1, wherein the application instance is a web application instance.

8. The method of claim 1, wherein the one or more commands are in correspondence with one or more of:
a voice input, a gesture input, an eye movement input, or a brain wave input.

9. The method comprising:
recognizing, through the input processing unit, the voice input as plain text;
translating, through the input processing unit, the plain text into command information; and
generating, through the input processing unit, the one or more commands based on the command information.

10. A method comprising:
establishing a persistent connection between an application instance and an instance of an input processing unit using the pairing information;
receiving command information via the input processing unit paired to the application instance presently executing on a computing device;
generating, based on the command information, one or more commands for performing one or more operations of the application instance, wherein the one or more commands are received in command data output from the instance of the input processing unit based on user input received via the input processing unit;
identifying, through checking the pairing information, that the application instance paired with the input processing unit is associated with the one or more commands;
converting the one or more commands into application instance specific computing instructions for execution of the one or more operations; and
sending the application instance specific computing instructions to the application instance for execution of the one or more operations.

11. The method of claim 10, further comprising:
sending a request for identification information of the application instance;
receiving the identification information of the application instance; and
outputting the identification information of the application instance.

12. The method of claim 11, wherein the identification information of the application instance comprises an authentication token.

13. The method of claim 11, wherein the outputted identification information is to be obtained by an input processing unit and used for pairing up with the input processing unit.

14. The method of claim 13, wherein the command information is generated by the input processing unit.

15. The method of claim 14, wherein the command information is in correspondence with one or more of: a voice input, a gesture input, an eye movement input, or a brain wave input.

16. The method of claim 10, wherein the application instance is a document processing application instance, and wherein the one or more commands are to control the presentation and/or editing of an electronic document operated in the document processing application instance.

17. An apparatus comprising:
at least one processor; and
memory including instructions that, when executed by the at least one processor, cause the at least one processor to perform operations to:
establish a persistent connection between an application instance and an instance of an input processing unit using pairing information;
receive command information via the input processing unit paired to the application instance presently executing on a computing device;
generate, based on the command information, one or more commands for performing one or more operations of an application instance, wherein the one or more commands are received in command data output from the instance of the input processing unit based on user input received via the input processing unit;
identify, through checking the pairing information, that the application instance paired with the input processing unit is associated with the one or more commands;
converting the one or more commands into application instance specific computing instructions for execution of the one or more operations; and
sending the application instance specific computing instructions to the application instance for execution of the one or more operations.

18. The apparatus of claim 17, the memory further comprising instructions that, when executed by the at least one processor, cause the at least one processor to perform operations to:
send a request for identification information of the application instance,
to receive the identification information of the application instance, and
output the identification information of the application instance.

* * * * *